(12) United States Patent
Adamczak et al.

(10) Patent No.: US 12,060,913 B2
(45) Date of Patent: Aug. 13, 2024

(54) BRAKING SYSTEM WITH AIR BLOWING IN THE GROOVE IN THE LINING

(71) Applicant: TALLANO TECHNOLOGIE, Boulogne Billancourt (FR)

(72) Inventors: Loïc Adamczak, Boulogne Billancourt (FR); Thibaut Le Boulaire, Boulogne Billancourt (FR)

(73) Assignee: TALLANO TECHNOLOGIE, Boulogne Billancourt (FR)

( * ) Notice: Subject to any disclaimer, the term of this patent is extended or adjusted under 35 U.S.C. 154(b) by 416 days.

(21) Appl. No.: 17/598,822

(22) PCT Filed: Mar. 27, 2020

(86) PCT No.: PCT/EP2020/058815
§ 371 (c)(1),
(2) Date: Sep. 27, 2021

(87) PCT Pub. No.: WO2020/193775
PCT Pub. Date: Oct. 1, 2020

(65) Prior Publication Data
US 2022/0178410 A1 Jun. 9, 2022

(30) Foreign Application Priority Data
Mar. 28, 2019 (FR) ........................................ 1903216

(51) Int. Cl.
*F16D 65/00* (2006.01)
*F16D 65/092* (2006.01)

(52) U.S. Cl.
CPC ....... *F16D 65/0031* (2013.01); *F16D 65/092* (2013.01)

(58) Field of Classification Search
None
See application file for complete search history.

(56) References Cited

U.S. PATENT DOCUMENTS 9,726,241 B2 8/2017 Rocca-Serra
2015/0001013 A1 1/2015 Mennie

FOREIGN PATENT DOCUMENTS

DE 4401846 A1 7/1995
DE 198 46 887 A1 4/2000
(Continued)

OTHER PUBLICATIONS

Office Action issued in Indian Patent Application No. 202147043313 dated Feb. 21, 2023.
(Continued)

*Primary Examiner* — Melanie Torres Williams
(74) *Attorney, Agent, or Firm* — NIXON & VANDERHYE

(57) ABSTRACT

Disclosed is a braking system including a brake pad with a backing plate having first and second faces, and a lining made of friction material on the first face. The lining having friction and mounting faces, and inner, outer, rear and front edges. The lining has a collection groove open to the friction face, and an opening at its first end towards the inner edge and an opening at its second end towards the outer edge. The braking system further includes a suction system with suction and blow pipes through which air is sucked in and a blown. The air inlet orifice of the suction pipe is opposite one end of the groove, and the air outlet orifice of the blow pipe is opposite the other end of the groove.

20 Claims, 5 Drawing Sheets

(56) References Cited

FOREIGN PATENT DOCUMENTS

| | | | |
|---|---|---|---|
| FR | 3 057 040 | | 4/2018 |
| GB | 2533476 | | 6/2016 |
| JP | 2007192268 A | * | 8/2007 |
| JP | 2013144585 A | | 7/2013 |
| KR | 1998-0041410 U | | 9/1998 |
| RU | 2 644 037 C2 | | 2/2018 |
| WO | 2013/084188 A1 | | 6/2013 |
| WO | 2018/065541 A1 | | 4/2018 |
| WO | WO-2019025723 A1 | * | 2/2019 .............. B60T 17/02 |

OTHER PUBLICATIONS

International Search Report for PCT/EP2020/058815 dated Jun. 9, 2020, 5 pages.
Written Opinion of the ISA for PCT/EP2020/058815 dated Jun. 9, 2020, 5 pages.
Search Report in Russian Patent Application No. 2021129778/11 dated Apr. 6, 2023.
Notification of Opposition, issued in European Patent Application No. 20713052.7 dated Feb. 19, 2024.

* cited by examiner

[Fig. 1]
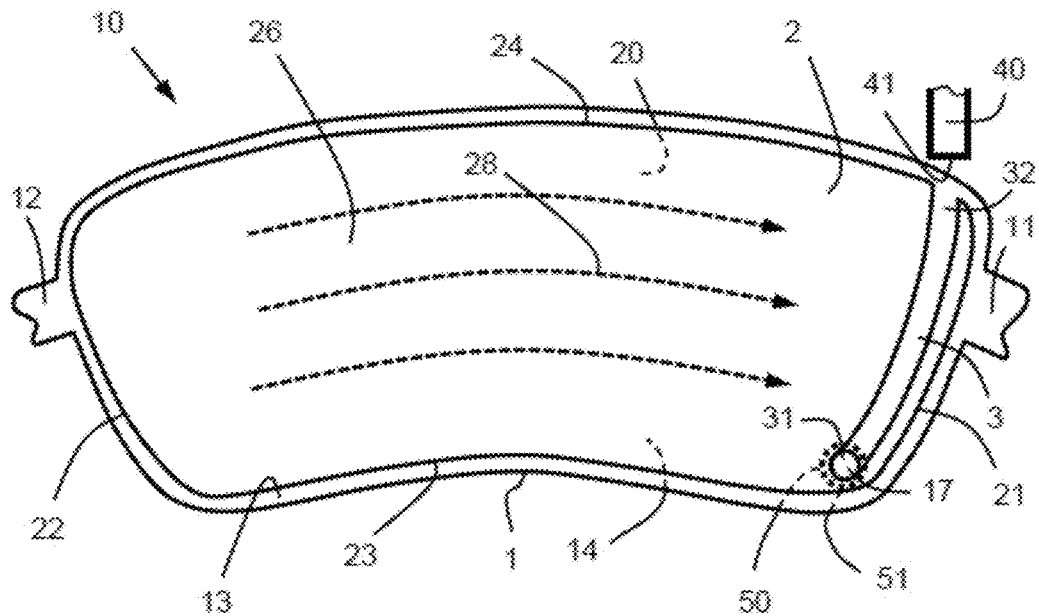
[Fig. 2]
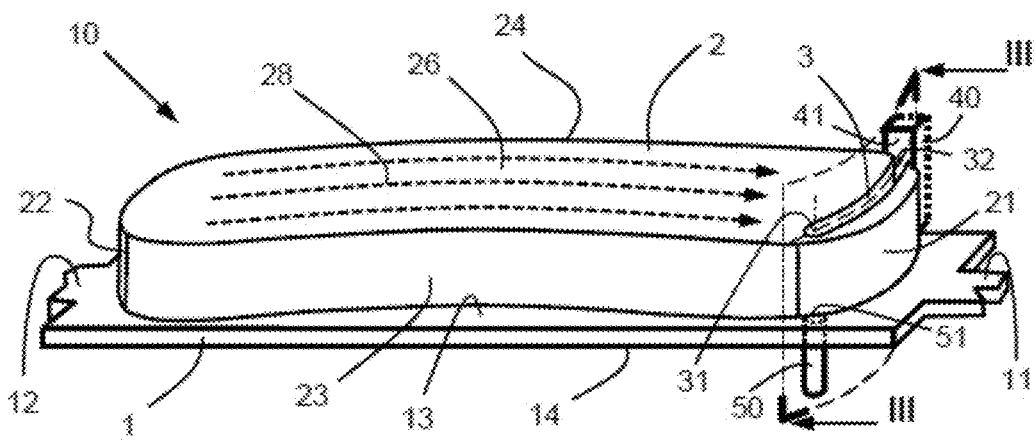

[Fig. 3]
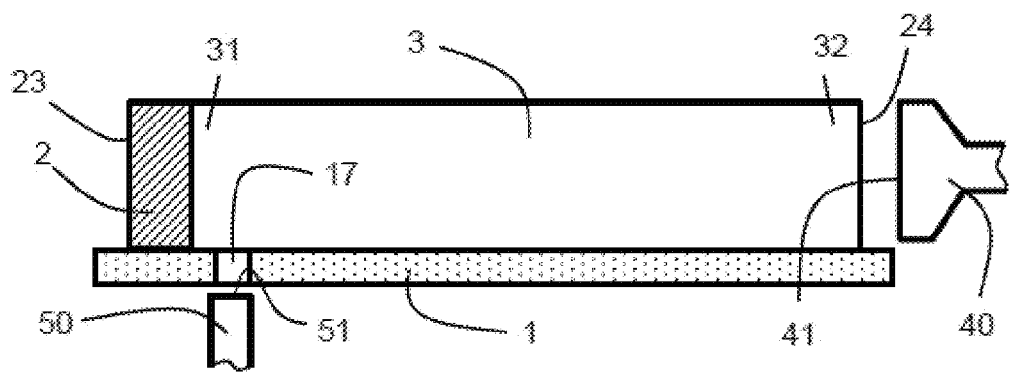
[Fig. 4]
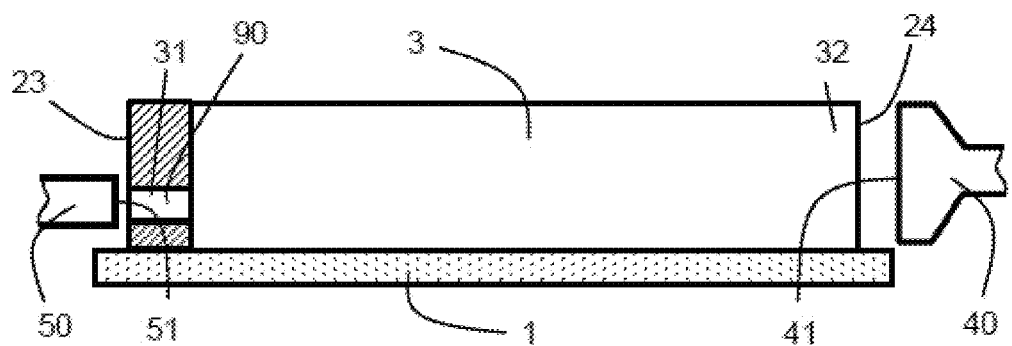
[Fig. 5]
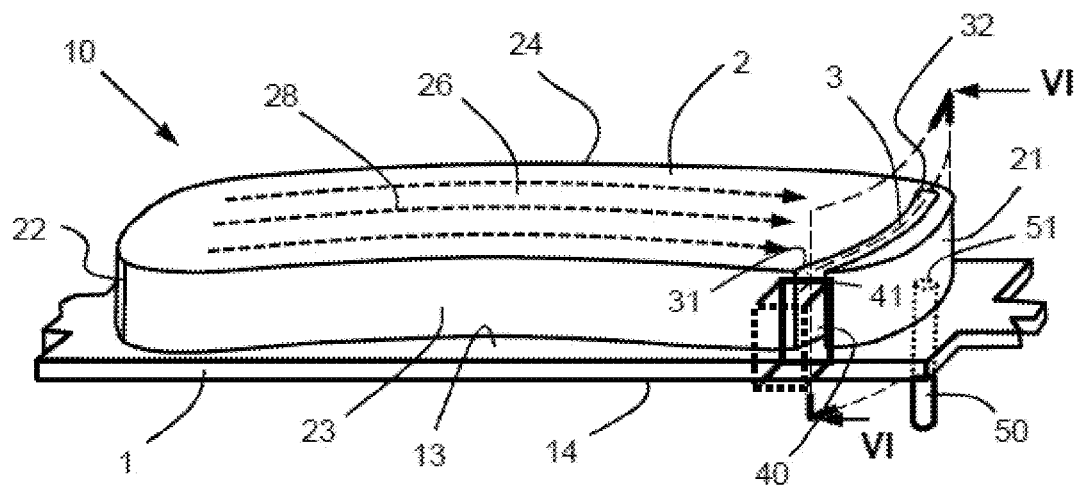

[Fig. 6]
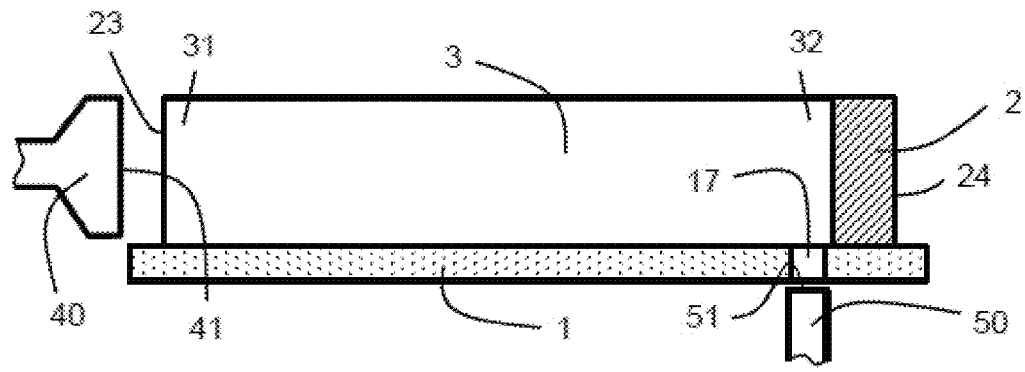
[Fig. 7]
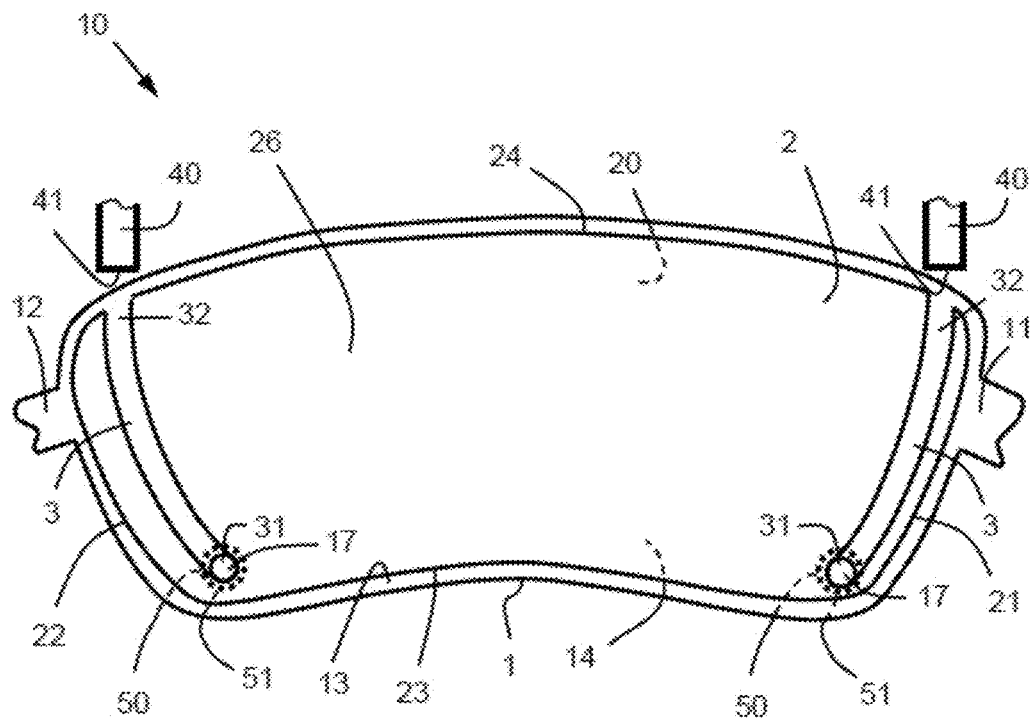

[Fig. 8]
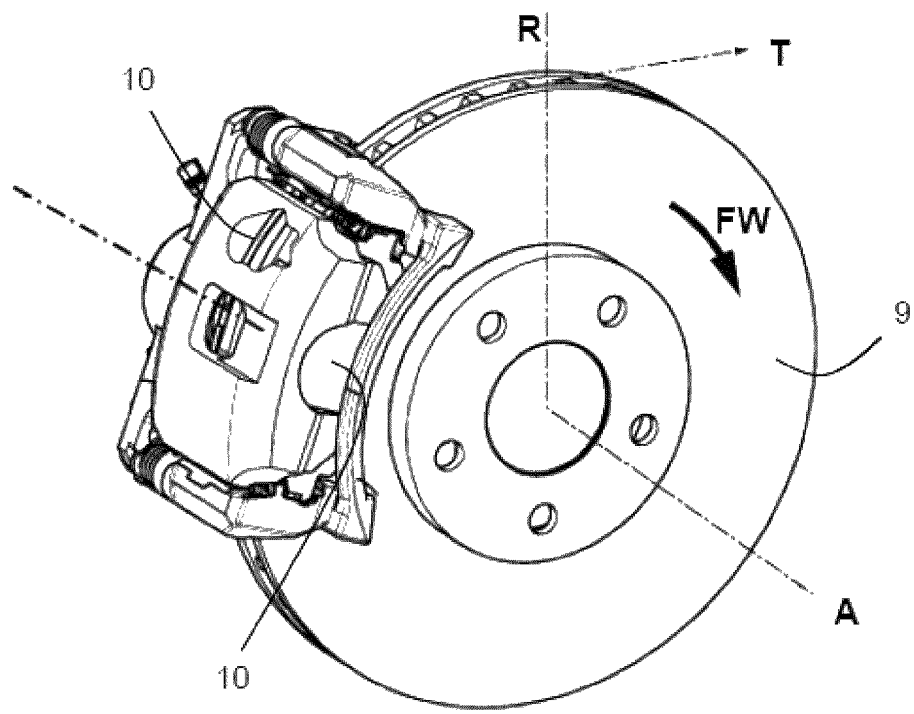
[Fig. 9]
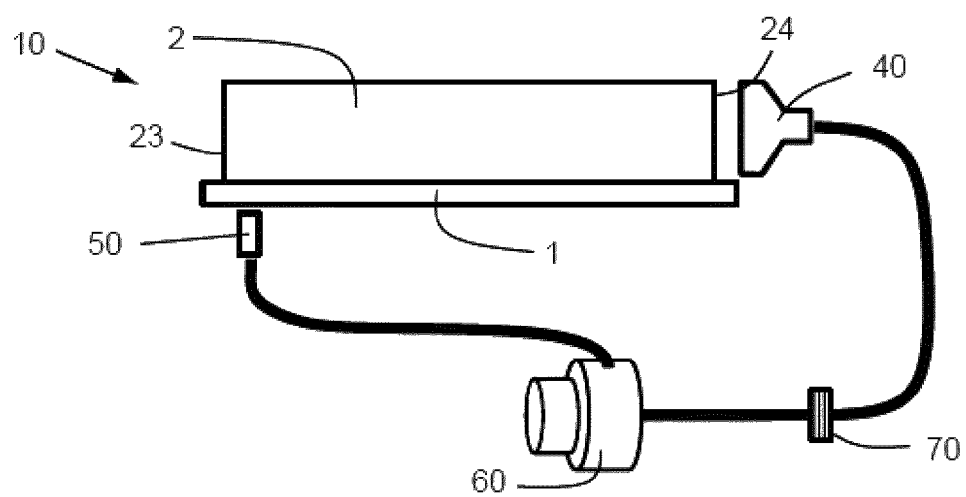

[Fig. 10] PRIOR ART
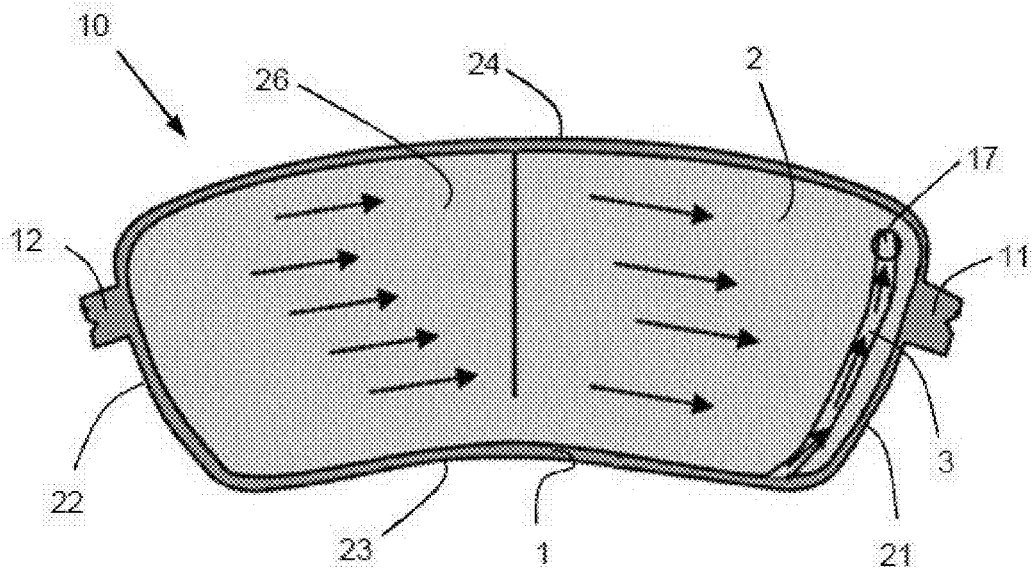
[Fig. 11] PRIOR ART
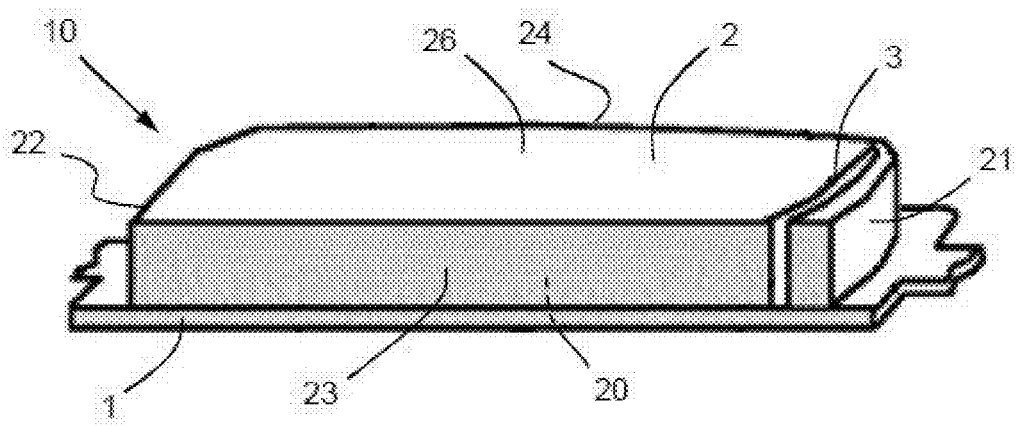

BRAKING SYSTEM WITH AIR BLOWING IN THE GROOVE IN THE LINING

This application is the U.S. national phase of International Application No. PCT/EP2020/058815 filed Mar. 27, 2020 which designated the U.S. and claims priority to FR Patent Application No. 1903216 filed Mar. 28, 2019, the entire contents of each of which are hereby incorporated by reference.

BACKGROUND OF THE INVENTION

Field of the Invention

This invention relates to non-polluting braking systems, intended for use in machines comprising a rotating element whose rotation is to be slowed down, for example such as road or railway vehicles, or wind turbines.

Description of the Related Art

In such braking systems, particles and dust are emitted by friction braking, as a result of abrasion of the brake pads against the rotating element. This rotating element is for example the wheel of the vehicle, or a disc driven by the wheel of the vehicle. It is known that these particles dispersed into the ambient environment are harmful to an individual's health. In addition, the growth of electric motors for motor vehicles has reinforced the need to treat the particles and dust resulting from the abrasion of friction braking systems. There is therefore a need to capture these particles and dust before they are released into the ambient environment.

Thus, there is the known document FR 3,057,040 which describes a braking system comprising a brake pad 10, this pad comprising a backing plate 1 with a first face 13 and a second face 14, and a lining 2 made of friction material and fixed to the first face 13, the lining 2 being delimited by a friction face 26, a mounting face 20, an inner edge 23, an outer edge 24, a rear edge 21, and a front edge 22. The lining 2 is provided with at least one collection groove 3 which is open to the friction face 26, and which has an opening at its first end towards the inner edge 23 and has an opening at its second end 31 towards the outer edge 24. The backing plate 1 comprises a hole 17 in fluid communication with the collection groove 3. The hole 17 is connected to a suction system by a suction pipe 40 capable of sucking in the air and the particles and dust flowing in the groove 3.

Such a braking system is illustrated in FIGS. 10 and 11, and represents the prior art.

However, this braking system has disadvantages.

In fact, particles and dust continue to escape in undesirable amounts during the braking phases.

SUMMARY OF THE INVENTION

The invention aims to remedy these disadvantages.

The invention aims to provide a braking system for which the capture of particles and dust emitted by the lining and rotating element is optimized, and for which the construction is as simple as possible.

This object is achieved by virtue of the fact that the braking system further comprises a suction system which comprises a suction pipe through which air is able to be sucked in, and a blow pipe through which air is able to be blown, the air inlet orifice of the suction pipe being located opposite one end of the at least one groove, selected among the first end and the second end, and the air outlet orifice of the blow pipe being located opposite the other end of the groove, selected among the first end and the second end.

Due to these arrangements, the collection of particles and dust by the suction system is more efficient, since the simultaneous blowing and suctioning of air makes it possible to guide the particles and dust towards the suction pipe. The release of these particles and dust into the atmosphere is therefore minimized.

Advantageously, neither the suction pipe nor the blow pipe are in contact with the lining or the backing plate.

There is thus no generation, after the braking phase, of a more or less significant residual torque when the linings and pads move away from the rotating element.

For example, the air inlet orifice of the suction pipe is located opposite the second end, and the air outlet orifice of the blow pipe is located opposite the first end.

Thus, air flows in the groove from the inner edge to the outer edge of the lining. Since this direction is the natural direction (without suction/blowing) of the air flow in the groove under the effect of centrifugal force, the collection of particles and dust in the suction pipe is more efficient.

Advantageously, the first end opens onto the inner edge.

Air thus escapes from the groove (towards the suction pipe) in the extension of the groove, which makes the suction more efficient. In addition, since the suction pipe is located in the main plane of the lining, it is not necessary to modify the caliper to integrate this pipe into the structure of the braking system.

Advantageously, the air inlet orifice of the suction pipe is located opposite the first end, and the air outlet orifice of the blow pipe is located opposite the second end.

Air thus flows in the groove from the outer edge to the inner edge of the lining.

Advantageously, the second end opens onto the outer edge.

Air thus escapes from the groove (towards the suction pipe) in the extension of the groove, which makes the suction more efficient. In addition, since the suction pipe is located in the main plane of the lining, it is not necessary to modify the caliper to integrate this pipe into the structure of the braking system.

Advantageously, the suction system comprises a pump and a filter, the pump, the filter, the suction pipe, and the blow pipe forming a continuous circuit.

The suction system is thus simplified. In addition, the air filtered by the filter is reused for blowing into the groove, causing particles (which have not already been captured by the filter) to pass through the filter several times. The probability that particles will be stored in this filter is therefore increased.

Advantageously, the at least one groove is located near the rear edge.

The capture of particles and dust by the groove is thus optimized, these particles and dust having a tendency to flow from the front to the rear of the lining, since this direction of flow is the direction of movement of the rotating element relative to the lining at rest.

Advantageously, the lining is provided with a second groove which is located substantially midway between the front edge and the rear edge.

The vibrational behavior of the lining-disc assembly during braking is thus improved.

Advantageously, the lining is provided with an additional groove which is located near the front edge.

The system according to the invention thus operates equally efficiently in both directions of rotation of the rotating element relative to the lining, which is advantageous for vehicles which must brake in both directions, such as railway vehicles.

BRIEF DESCRIPTION OF THE DRAWINGS

The invention will be better understood and its advantages will be more apparent upon reading the following detailed description of embodiments represented as non-limiting examples. The description refers to the accompanying drawings, in which:

FIG. 1 is a top view of a brake pad of a braking system according to the invention, FIG. 2 is a perspective view of a brake pad of a braking system according to the invention, FIG. 3 is a section view following the collection groove of a brake pad of a braking system according to the invention, along line III-III of FIG. 2, FIG. 4 is a section view following the collection groove according to a variant, FIG. 5 is a perspective view of a brake pad of a braking system according to another embodiment of the invention, FIG. 6 is a section view following the collection groove of a brake pad of a braking system according to the invention, along line VI-VI of FIG. 5, FIG. 7 is a top view of a brake pad of a braking system according to yet another embodiment of the invention, FIG. 8 is a perspective view of a braking system according to the invention, mounted on a rotating disc, FIG. 9 is a schematic view of an example of a suction system of a braking device according to the invention, FIG. 10, already described, shows a top view of a pad according to the prior art, FIG. 11, already described, shows a perspective view of a pad according to the prior art.

DESCRIPTION OF THE PREFERRED EMBODIMENTS

The invention relates to a braking system which comprises a brake pad 10 of a brake intended for braking a rotating element 9 of a machine. The invention is described below in the case where the machine is a road vehicle in which this brake is a disc brake. However, the invention applies equally well to the case of a brake pad in a shoe brake which rubs on a wheel, used in vehicles on rails (railway vehicles), or to the case of a brake pad used in any other industrial machine (for example in the case of a wind turbine). In all cases, the braking of a rotating element of the machine is achieved by friction of the brake pad on this rotating element during its rotation.

In a disc brake, the braking is achieved by friction between a disc (which is the rotating element 9) which is integral with a wheel of the vehicle, and two brake pads 10 which press against this disc 9 one on each side in order to sandwich it. The disc 9 extends in a main plane and has as its axis of rotation an axis A which is perpendicular to this main plane.

Each of the pads 10 extends in this main plane, such that the thickness of a pad 10 extends along the axis of rotation A.

The disc 9 rotates about the axis of rotation A with a direction of rotation FW, which defines a tangential direction T which is tangent to the circumference of the disc 9 and oriented in the direction of rotation FW, and a radial direction R orthogonal to the axis of rotation A in the main plane of the disc 9.

These elements are indicated in FIG. 8, which shows the braking device mounted on the disc 9.

In the description which follows, the terms "inner" and "outer" denote the edges or areas of the brake pad 10 (or of its components) which are located respectively closest to and furthest from the axis of rotation A, and the terms "front" and "rear" denote the edges or areas of the brake pad 10 (or of its components) which are located respectively upstream and downstream relative to the flow direction of the particles 28 emitted by the lining 2 (described below) which is also the direction of rotation FW.

As illustrated in FIGS. 1 and 2, a brake pad 10 comprises a backing plate 1, also called a backplate. The backing plate 1 is for example made of metal. The backing plate 1 is a flat plate of substantially constant thickness (for example between 3 and 7 mm), its general shape in its main plane being trapezoidal with straight or curved edges.

The backing plate 1 comprises a first face 13 on which is fixed a lining 2, and a second face 14 which is opposite to the first face 13. The backing plate 1 also comprises two ears (11, 12), which extend in the plane of the backing plate 1 at two lateral ends thereof, and which serve to hold and guide the pad 10.

The brake pad 10 further comprises a lining 2 made of a friction material. For example, this material is a material called "ferodo".

The lining 2 is delimited by a friction face 26 ("rubbing" face), a mounting face 20 opposite to the friction face 26 (these two faces being parallel) and fixed to the backing plate 1, an inner edge 23, an outer edge 24, a rear edge 21, and a front edge 22. The outer 24, rear 21, and front 22 edges are convex or rectilinear; the inner edge 23 is concave or rectilinear.

The friction face 26 gradually approaches the backing plate 1 as the lining 2 wears away. The thickness of the lining 2 (measured along the axis of rotation A) therefore decreases as it wears.

During operation, the lining 2 (and the rotating element 9) releases particles 28 due to friction between the lining 2 and the disc 9. The paths of the particles 28 along the friction face 26 are represented by dotted lines in FIGS. 1 and 2.

The lining 2 is provided with at least one collection groove 3 that is open to the friction face 26.

The groove 3 has a first end 31 and a second end 32. The groove 3 has an opening at its first end 31 towards the inner edge 23, and at its second end 32 towards the outer edge 24.

"The groove 3 has an opening at its end towards an edge" is understood to mean that the groove 3 has a communicating opening at this end in proximity to the edge, in other words either by extending through the backing plate 1 or by opening directly onto this edge.

In all cases, each of the ends of the groove open onto to a surface that is not the friction face 26.

The depth of the groove(s) 3 is for example equal to the height of the lining 2, meaning that the bottom of the groove 3 is coincident with the first face 13 of the backing plate 1. Alternatively, the depth of the groove(s) 3 is less than the height of the lining 2.

For example, the collection groove(s) 3 has a constant rectangular cross-section from its upstream end to its downstream end, and is therefore of constant thickness.

For example, the collection groove 3 is located near the rear edge 21. This configuration makes it possible to collect more efficiently in this groove 3 the particles/dust resulting from braking, given that the particles naturally flow from the front to the rear of the lining 2. In fact, this direction of flow is the direction of movement of the rotating element 9 relative to the lining 2 at rest.

Optionally, the lining 2 further comprises a second collection groove 3 which is located substantially midway between the front edge 22 and the rear edge 21.

This position of the second collection groove 3 makes it possible to minimize undesirable vibrations of the lining 2.

The braking system comprises a suction system which comprises a suction pipe 40 through which air is sucked in, and a blow pipe 50 through which air is blown. The suction pipe 40 comprises an air inlet orifice 41 which is located opposite one end of the at least one groove 3, selected among its first end 31 and its second end 32. The blow pipe 50 comprises an air outlet orifice 51 which is located opposite the other end of the at least one groove 3, selected among its first end 31 and its second end 32.

We will now describe a first embodiment, with reference to FIGS. 1 to 4, wherein the air inlet orifice 41 of the suction pipe 40 is located opposite the second end 32, and the air outlet orifice 51 of the blow pipe 50 is located opposite the first end 31.

This embodiment has the advantage that the flow of air forced by the suction system takes place in the same direction as the natural flow of air in the groove 3. In fact, under the influence of centrifugal force, the air flows naturally from the first end 31 to the second end 32. The suction system is therefore more efficient.

As illustrated in FIGS. 1 to 3, the groove 3 does not open directly onto the inner edge 23. A wall formed by the lining 2 therefore separates the first end 31 from the inner edge 23. The groove 3 opens to the outside via a hole 17 in the backing plate 1. This hole 17 places the first face 13 of the backing plate 1 in communication with the second face 14. The outlet orifice 51 of the blow pipe 50 is opposite the orifice of the hole 17 in the second face 14. The air blown by the blow pipe 50 traverses the backing plate 1 through the hole 17, enters the groove 3, and flows from the first end 31 to the second end 32. The second end 32, which opens onto the outer edge 24, has for its cross-section that of the groove 3. The air inlet orifice 41 of the suction pipe 40 is located in the extension of the groove 3. The air flowing in the groove 3 enters the suction pipe 40 through this inlet orifice 41.

Alternatively, at the inner edge 23 the groove 3 is shaped as a channel 90 which places the remainder of the groove 3 in communication with the inner edge 23, as shown in FIG. 4. Thus, this channel 90 has a continuous side wall surrounded by the lining 2, its first end opening into the rest of the groove 3 and its second end (which is thus the first end 31 of the groove 3) opening onto the inner edge 23. The outlet orifice 51 of the blow pipe 50 is opposite the second end of the channel 90. The air flows from the blow pipe 50 and towards the suction pipe 40 which is directly in the extension of the groove (in the longitudinal direction of the groove 3), which increases the efficiency of the suction system. This configuration improves the air flow in the groove 3, including as the lining 2 wears away. Advantageously, the channel 90 is as close as possible to the backing plate 1, in order to maximize the working thickness of the lining 2 during operation.

In addition, it is not necessary to modify the backing plate 1 (for example by drilling a hole, since the backing plate 1 is continuous for the entire length of the groove 3), which simplifies the manufacture of the braking system.

The channel 90 is of constant cross-section, for example of circular cross-section. Alternatively, the channel 90 has a cross-section at its first end which is greater than its cross-section at its second end, so that air more easily enters the groove 3 through the channel 90.

We will now describe a second embodiment with reference to FIGS. 5 and 6, wherein the air inlet orifice 41 of the suction pipe 40 is located opposite the first end 31, and the air outlet orifice 51 of the blow pipe 50 is located opposite the second end 32.

The air flow which is forced by the suction system is from the second end 32 towards the first end 31.

The groove 3 does not open directly onto the outer edge 24. A wall formed by the lining 2 therefore separates the second end 32 from the outer edge 24. The groove 3 opens to the outside through a hole 17 in the backing plate 1. This hole 17 places the first face 13 of the backing plate 1 in communication with the second face 14. The outlet orifice 51 of the blow pipe 50 is opposite the orifice of the hole 17 in the second face 14. The air blown by the blow pipe 50 traverses the backing plate 1 through the hole 17, enters the groove 3, and flows from the second end 32 to the first end 31. The first end 31, which opens onto the inner edge 23, has for its cross-section that of the groove 3. The air inlet orifice 41 of the suction pipe 40 is located in the extension of the groove 3. The air flowing in the groove 3 enters the suction pipe 40 through this inlet orifice 41.

Alternatively, at the outer edge 24 the groove 3 is shaped as a channel 90 which places the remainder of the groove 3 in communication with the inner edge. Thus, the second end 32 of the groove 3 opens directly onto the outer edge 24 via the channel 90. The outlet orifice 51 of the blow pipe 50 is opposite the end of the channel 90 at the outer edge 24. The blowing therefore takes place from the blow pipe 50 into the groove 3 via the outer edge 24 and through the channel 90. The backing plate 1 is continuous for the entire length of the groove 3, so air does not pass through the backing plate 1.

Advantageously, in all embodiments, there is no contact of the suction pipe 40 and of the blow pipe 50 with the lining 2 or with the backing plate 1. Thus, after the braking phase, there is no generation of a more or less significant residual torque when the linings 2 and the backing plates 1 move away from the rotating element, this residual torque being generated by the fact that a pipe is in contact with the lining 2 or the backing plate 1.

In this configuration, the suction pipe 40 and the blow pipe 50 are located outside the area of displacement of the backing plate 1 (the amplitude of this displacement resulting from wear of the lining 2 over the lifetime of the brake pad 10) so that neither the suction pipe 40 nor the blow pipe 50 are in contact with the lining 2 or the backing plate 1 during the entire service life of the brake pad 10.

In this configuration, advantageously, the inlet orifice 41 of the suction pipe 40 and the outlet orifice 51 of the blow pipe 50 are furthermore located as close as possible to the inner edge 23 or to the outer edge 24 depending on the case, so as to maximize the passage of air between the groove 3 on the one hand and the suction pipe 40 and blow pipe 50 on the other hand.

FIG. 7 illustrates the case where the lining 2 is provided with an additional groove 3 which is located near the front edge 22, in addition to the first groove 3 located near the rear edge 21. The lining 2 then comprises two grooves 3.

The suction device therefore comprises a first blow pipe 50 and a first suction pipe 40 which enable air to flow in the first groove 3, and a second blow pipe 50 and a second suction pipe 40 which enable air to flow in the additional groove 3. Each of these pipes is connected to an element, which is part of the suction device, capable of causing air to flow in each of the grooves 3.

This double-groove 3 configuration is suitable for vehicles which are subjected to braking in both directions, such as railway vehicles. Indeed, in this case the particles 28 released by friction of the lining 2 on the rotating element can flow either from the front edge 22 to the rear edge 21, or from the rear edge 21 to the front edge 22. The presence of two grooves 3 makes it possible to capture the particles in a groove 3, regardless of the braking direction of the vehicle.

According to yet another embodiment, the lining 2 comprises another groove 3 (called the second groove) which is located substantially midway between the front edge 22 and the rear edge 21, this second groove 3 having been described above. The additional groove 3 which is located near the front edge 22 is then a third groove 3. This embodiment thus makes it possible both to minimize undesirable vibrations of the lining 2 and to capture particles in a groove 3 regardless of the braking direction of the vehicle.

In general, the suction system comprises an element capable of blowing air in the blow pipe 50 and an element (which is the same or a separate element) capable of sucking in air via the suction pipe 40.

FIG. 9 illustrates the case of a suction system which comprises a pump 60 (which is then the above element) and a filter 70, the pump 60, the filter 70, the suction pipe 40, and the blow pipe 50 forming a continuous circuit. For example, there is a single pump 60.

Thus, the pump 60, the filter 70, the suction pipe 40, and the blow pipe 50 form, together with the groove 3, a circuit in which the air flows in a closed circuit. The air filtered by the filter 70 is thus reused to be blown into the groove 3, which causes the particles (not already captured by the filter 70) to pass through the filter 70 several times. The probability of particles being stored in this filter 70 is therefore increased, and the amount of particles and dust released into the atmosphere is reduced.

According to a variant, the suction system comprises a pump 60, a filter 70, the suction pipe 40 and the blow pipe 50, and a discharge valve, so as to form a circuit which is partially open. This configuration has the advantage of making it possible to adjust the speed of the blown air to the suction speed in order to optimize the collection of particles and dust in the groove 3.

In this variant, the suction system comprises a control unit which is capable of controlling the discharge valve which is a solenoid valve. The system can then be optimized. Thus, depending on the rate of acceleration or deceleration of the vehicle, the control unit can suppress the blowing. For example, when accelerating the vehicle immediately following braking, it is preferable not to blow air into the groove 3 as this could disperse the particles present therein, but to suction only. In this case, the control unit opens the discharge valve in order to suck air from the groove 3 without blowing into it.

According to another variant, the element capable of sucking in air through the suction pipe 40 is a unit located on the path of the air in the suction pipe 40, downstream of the inlet orifice 41, and which is designed with an upstream inlet of smaller cross-section than its downstream outlet.

The invention claimed is:

1. Braking system comprising a brake pad, said pad comprising a backing plate with a first face and a second face, and a lining made of friction material and fixed to said first face, the lining being delimited by a friction face, a mounting face, an inner edge, an outer edge, a rear edge, and a front edge, said lining being provided with at least one collection groove which is open to the friction face, and which has an opening at the at least one collection groove's first end towards said inner edge and has an opening at the at least one collection groove's second end towards said outer edge, said braking system further comprising a suction system which comprises a suction pipe through which air is able to be sucked in, and a blow pipe through which air is able to be blown, an air inlet orifice of said suction pipe being located opposite one end of said at least one groove, selected among said first end and said second end, and an air outlet orifice of said blow pipe being located opposite the other end of said at least one groove, selected among said first end and said second end.

2. The braking system according to claim 1, wherein neither the suction pipe nor the blow pipe are in contact with said lining or said backing plate.

3. The braking system according to claim 1, wherein the air inlet orifice of said suction pipe is located opposite said second end, and the air outlet orifice of said blow pipe is located opposite said first end.

4. The braking system according to claim 3, wherein said first end opens onto said inner edge.

5. The braking system according to claim 1, wherein the air inlet orifice of said suction pipe is located opposite said first end, and the air outlet orifice of said blow pipe is located opposite said second end.

6. The braking system according to claim 5, wherein said second end opens onto said outer edge.

7. The braking system according to claim 1, wherein said suction system comprises a pump and a filter, said pump, said filter, said suction pipe, and said blow pipe forming a continuous circuit.

8. The braking system according to claim 1, wherein said at least one groove is located near said rear edge.

9. The braking system according to claim 8, wherein said lining is provided with a second groove which is located substantially midway between said front edge and said rear edge.

10. The braking system according to claim 8, wherein said lining is provided with an additional groove which is located near said front edge.

11. The braking system according to claim 2, wherein the air inlet orifice of said suction pipe is located opposite said second end, and the air outlet orifice of said blow pipe is located opposite said first end.

12. The braking system according to claim 2, wherein the air inlet orifice of said suction pipe is located opposite said first end, and the air outlet orifice of said blow pipe is located opposite said second end.

13. The braking system according to claim 2, wherein said suction system comprises a pump and a filter, said pump, said filter, said suction pipe, and said blow pipe forming a continuous circuit.

14. The braking system according to claim 3, wherein said suction system comprises a pump and a filter, said pump, said filter, said suction pipe, and said blow pipe forming a continuous circuit.

15. The braking system according to claim 4, wherein said suction system comprises a pump and a filter, said pump, said filter, said suction pipe, and said blow pipe forming a continuous circuit.

16. The braking system according to claim 5, wherein said suction system comprises a pump and a filter, said pump, said filter, said suction pipe, and said blow pipe forming a continuous circuit.

17. The braking system according to claim 6, wherein said suction system comprises a pump and a filter, said pump, said filter, said suction pipe, and said blow pipe forming a continuous circuit.

18. The braking system according to claim 2, wherein said at least one groove is located near said rear edge.

19. The braking system according to claim 3, wherein said at least one groove is located near said rear edge.

20. The braking system according to claim 4, wherein said at least one groove is located near said rear edge.

\* \* \* \* \*